(12) United States Patent
Liang et al.

(10) Patent No.: US 11,895,544 B2
(45) Date of Patent: Feb. 6, 2024

(54) CELL RESELECTION METHOD, TERMINAL, AND NETWORK DEVICE

(71) Applicant: VIVO MOBILE COMMUNICATION CO., LTD., Guangdong (CN)

(72) Inventors: Jing Liang, Chang'an Dongguan (CN); Li Chen, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 11 days.

(21) Appl. No.: 17/171,968

(22) Filed: Feb. 9, 2021

(65) Prior Publication Data

US 2021/0168679 A1    Jun. 3, 2021

Related U.S. Application Data

(63) Continuation of application No. PCT/CN2019/097238, filed on Jul. 23, 2019.

(51) Int. Cl.
| | | |
|---|---|---|
| *H04W 36/00* | (2009.01) | |
| *H04W 36/26* | (2009.01) | |
| *H04W 36/30* | (2009.01) | |
| *H04W 72/563* | (2023.01) | |

(52) U.S. Cl.
CPC . *H04W 36/00837* (2018.08); *H04W 36/0061* (2013.01); *H04W 36/0085* (2018.08); *H04W 36/008375* (2023.05); *H04W 36/26* (2013.01); *H04W 36/30* (2013.01); *H04W 72/563* (2023.01)

(58) Field of Classification Search
CPC ....... H04W 36/0061; H04W 36/00837; H04W 36/0085; H04W 36/0094; H04W 36/08; H04W 36/24; H04W 36/245; H04W 36/26; H04W 36/30; H04W 48/12; H04W 48/20; H04W 72/06
See application file for complete search history.

(56) References Cited

U.S. PATENT DOCUMENTS

| | | | |
|---|---|---|---|
| 2017/0257874 A1* | 9/2017 | Ma | ........................ H04W 24/08 |
| 2018/0035349 A1 | 2/2018 | Xu et al. | |
| 2018/0049094 A1* | 2/2018 | Fujishiro | ............... H04W 48/16 |

(Continued)

FOREIGN PATENT DOCUMENTS

| | | |
|---|---|---|
| CN | 101242654 A | 8/2008 |
| CN | 101400096 A | 4/2009 |
| CN | 101409904 A | 4/2009 |

(Continued)

OTHER PUBLICATIONS

EP Search Report in Application No. 19848302.6 dated Sep. 22, 2021.

(Continued)

*Primary Examiner* — Khoa Huynh
(74) *Attorney, Agent, or Firm* — Maschoff Brennan

(57) ABSTRACT

This disclosure provides a cell reselection method, a terminal, and a network device. The method includes: obtaining reselection information related to cell reselection, where the reselection information includes a per-cell reselection parameter of a neighboring cell; and performing a cell reselection procedure based on the per-cell reselection parameter and a reselection condition for reselecting to the neighboring cell.

10 Claims, 4 Drawing Sheets

Obtain reselection information related to cell reselection, where the reselection information includes a per-cell reselection parameter of a neighboring cell    21

Perform a cell reselection procedure based on the per-cell reselection parameter and a reselection condition for reselecting to the neighboring cell    22

(56) References Cited

U.S. PATENT DOCUMENTS

2018/0352508 A1    12/2018    Fujishiro et al.

FOREIGN PATENT DOCUMENTS

| CN | 101959286 A | | 1/2011 | |
|---|---|---|---|---|
| CN | 108243460 A | | 7/2018 | |
| WO | 2017126622 A1 | | 7/2017 | |
| WO | WO-2019095162 A1 | * | 5/2019 | ........ H04W 36/0061 |

OTHER PUBLICATIONS

"Consideration on cell specific priority" 3GPP TSG-RAN WG2 Meeting #90, R2-152503, Huawei, HiSilicon, May 25, 2015.

"Support for Randomized threshold offset based reselection" 3GPP TSG-RAN WG2 Meeting #91, China Telecom, ZTE, R2-15XXXX, Aug. 24, 2015.

"Discussion on the immediate cell reselection issue" 3GPP TSG-RAN WG2 Meeting #AH-1807, CMCC, R2-1810532, Jul. 2, 2018.

"CR to 25.304 on Cell Reselection enhancements" 3GPP TSG-RAN WG2 Meeting #68bis, R2-101614, Feb. 22, 2010, NTT DOCOMO.

"Cell reselection enhancements" 3PP TSG-RAN WG2 Meeting #68bis, R2-100770, Jan. 18, 2009, NTT DOCOMO.

Written Opinion and International Search Report in Application No. PCT/CN2019/097238 dated Feb. 18, 2021.

CN Office Action in Application No. 201810904656.4 dated Sep. 16, 2020.

Qualcomm Incorporated, "Miscellaneous Corrections based on endorsed CRs in NR AH#0218," 3GPP TSG-RAN2 NR AH#0218, R2-1810967, pp. 1-12, (Jul. 2018).

IP Office Action dated Mar. 22, 2022 as received in Application No. 2021-507028.

JP Office Action in Application No. 2021-507028 dated Nov. 8, 2022.

SG Office Action in Application No. 11202101386P dated Oct. 19, 2022.

* cited by examiner

CELL RESELECTION METHOD, TERMINAL, AND NETWORK DEVICE

CROSS-REFERENCE TO RELATED APPLICATIONS

This application is a continuation application of PCT Application No. PCT/CN2019/097238 filed on Jul. 23, 2019, which claims priority to Chinese Patent Application No. 201810904656.4 filed in China on Aug. 9, 2018, which is incorporated herein by reference in its entirety.

TECHNICAL FIELD

This disclosure relates to the field of communications technologies, and in particular, to a cell reselection method, a terminal, and a network device.

BACKGROUND

In a mobile communications system, when a terminal performs initial access, because the terminal does not know in advance which radio frequency channel (RF channel) is suitable for access, the terminal scans (scan) all RF channels based on a capability of the terminal, to look for a suitable (suitable) cell. On each scanned carrier frequency, the terminal only needs to search for a cell having best signal quality. After finding a suitable cell, the terminal selects to access and camp on the cell, and stops an initial cell selection procedure. In this case, if an RF channel that is not scanned exists, the terminal does not need to scan the RF channel any more.

When the terminal camps on a serving cell, the terminal may evaluate, in sequence based on a frequency priority order provided by a network device, whether a suitable neighboring cell is available for reselection on each frequency, and if detecting a suitable neighboring cell for reselection, the terminal may initiate a reselection procedure to the cell on the frequency.

Currently, during cell reselection, neighboring cells satisfying a condition need to be sorted. A parameter for determining whether a neighboring cell satisfies the condition may be obtained based on system information broadcast by the network device. However, the related parameter broadcast by the network device is per-frequency (per-frequency), and cannot reflect a specific status of the neighboring cell. It is possible that after the terminal performs cell reselection to a neighboring cell, the terminal finds that the cell cannot satisfy the reselection condition, and cannot camp on the cell, and the terminal needs to reselect or return to a source cell again, causing a ping-pong effect.

SUMMARY

Some embodiments of this disclosure provide a cell reselection method, a terminal, and a network device, to avoid a ping-pong effect during cell reselection.

According to a first aspect, some embodiments of this disclosure provide a cell reselection method, applied to a terminal and including:

obtaining reselection information related to cell reselection, where the reselection information includes a per-cell reselection parameter of a neighboring cell; and performing a cell reselection procedure based on the per-cell reselection parameter and a reselection condition for reselecting to the neighboring cell.

According to a second aspect, some embodiments of this disclosure further provide a terminal, including:

an obtaining module, configured to obtain reselection information related to cell reselection, where the reselection information includes a per-cell reselection parameter of a neighboring cell; and a reselection module, configured to perform a cell reselection procedure based on the per-cell reselection parameter and a reselection condition for reselecting to the neighboring cell.

According to a third aspect, some embodiments of this disclosure provide a terminal. The terminal includes a processor, a memory, and a computer program stored in the memory and capable of running on the processor. When the computer program is executed by the processor, the steps of the foregoing cell reselection method are implemented.

According to a fourth aspect, some embodiments of this disclosure provide a cell reselection method, applied to a network device and including:

sending reselection information related to cell reselection, where the reselection information includes a per-cell reselection parameter of a neighboring cell.

According to a fifth aspect, some embodiments of this disclosure further provide a network device, including:

a sending module, configured to send reselection information related to cell reselection, where the reselection information includes a per-cell reselection parameter of a neighboring cell.

According to a sixth aspect, some embodiments of this disclosure provide a network device. The network device includes a processor, a memory, and a computer program stored in the memory and capable of running on the processor. When the computer program is executed by the processor, the steps of the foregoing cell reselection method are implemented.

According to a seventh aspect, some embodiments of this disclosure provide a computer-readable storage medium. The computer-readable storage medium stores a computer program, and when the computer program is executed by a processor, the steps of the foregoing cell reselection method for the terminal or the network device are implemented.

Therefore, according to the foregoing technical solutions in some embodiments of this disclosure, the terminal can obtain the per-cell reselection parameter of the neighboring cell, and perform cell reselection based on the per-cell reselection parameter. This can ensure that quality of the reselected cell satisfies a camping requirement, and avoid a problem of connection instability of the terminal after cell reselection.

BRIEF DESCRIPTION OF DRAWINGS

To describe the technical solutions in the embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

Figure 1:
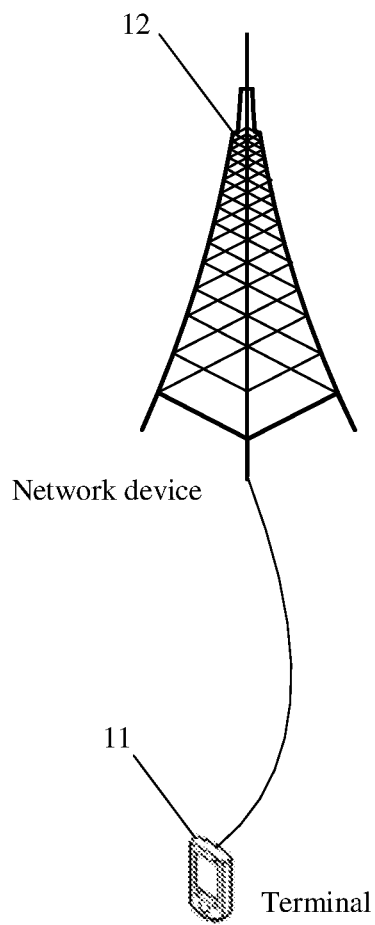
FIG. 1 presents a block diagram of a mobile communications system to which some embodiments of this disclosure may be applied.

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

In the specification and claims of this application, the terms such as "first" and "second" are intended to distinguish between similar objects but do not necessarily indicate a specific order or sequence. It should be understood that the numbers used in this way is interchangeable in appropriate circumstances so that the embodiments of this application described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device. The term "and/or" used in this specification and claims indicates at least one of connected objects.

Technologies described in this specification are not limited to long term evolution (LTE) and LTE-Advanced (LTE-A) systems, but may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The technologies described in this specification may be used for the foregoing systems and radio technologies, and may also be used for other systems and radio technologies. However, in the following descriptions, a new radio (NR) system is described for an illustration purpose, and NR terms are used in most of the following descriptions, although these technologies may also have other applications than the NR system.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

FIG. 1 is a block diagram of a wireless communications system to which some embodiments of this disclosure may be applied. The wireless communications system includes a terminal 11 and a network device 12. The terminal 11 may also be referred to as a terminal device or user equipment (UE). The terminal 11 may be a terminal-side device such as a mobile phone, a tablet computer (Tablet Personal Computer), a laptop computer (Laptop Computer), a personal digital assistant (PDA), a mobile Internet device (MID), a wearable device (Wearable Device), or a vehicle-mounted device. It should be noted that a specific type of the terminal 11 is not limited in some embodiments of this disclosure. The network device 12 may be a base station or a core network. The base station may be a 5G base station or a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (Basic Service Set, BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that only a base station in an NR system is used as an example in some embodiments of this disclosure, but a specific type of the base station is not limited.

Under control of a base station controller, the base station may communicate with the terminal 11. In various examples, the base station controller may be a part of the core network or some base stations. Some base stations may communicate control information or user data with the core network by using backhauls. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communications link. Each modulated signal may be sent on different carriers and may carry control information (for example, a reference signal or a control channel), overhead information, data, and the like.

The base station may perform wireless communication with the terminal 11 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (UL) transmission (for example, from the terminal 11 to the network device 12) or a downlink for carrying downlink (DL) transmission (for example, from the network device 12 to the terminal 11). UL transmission may also be referred to as reverse link transmission, and DL transmission may also be referred to as forward link transmission. The wireless communications system is briefly described above. To avoid a ping-pong effect during cell reselection in the wireless communications system, some embodiments of this disclosure provide a cell reselection method.

Figure 2:
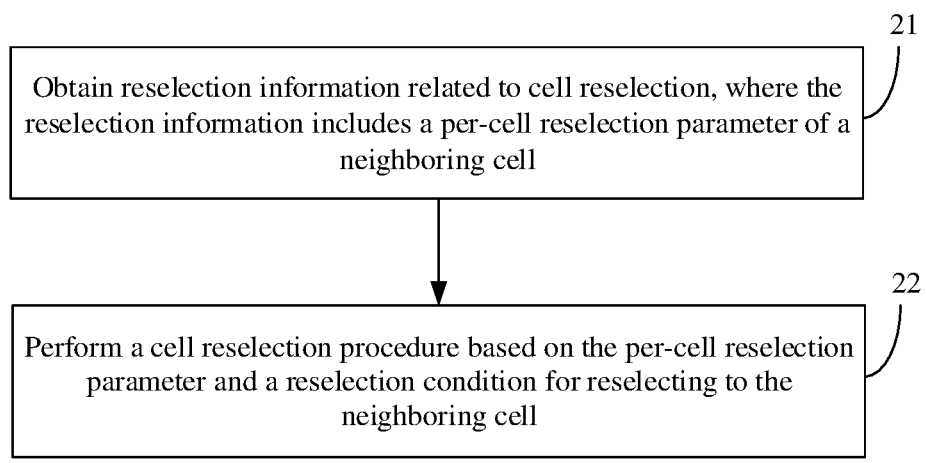
FIG. 2 presents a schematic flowchart of a cell reselection method for a terminal according to some embodiments of this disclosure.

As shown in FIG. 2, some embodiments of this disclosure provide a cell reselection method, applied to a terminal. The method may include the following steps.

Step 21: Obtain reselection information related to cell reselection, where the reselection information includes a per-cell reselection parameter of a neighboring cell.

The neighboring cell may be one of cells suitable for reselection, and different neighboring cells may be configured with a same priority or different priorities. Further, frequencies of different neighboring cells are located may be configured with a same priority or different priorities. A cell suitable for reselection is a cell on which the terminal can camp and obtain a normal service. The terminal needs to have a valid universal subscriber identity module (USIM), and satisfy the following condition:

The cell belongs to a network corresponding to one of target public land mobile network (PLMN) identifiers, and a target PLMN includes at least one of a PLMN selected by the terminal (selected PLMN), a PLMN with which the terminal registers (Registered PLMN), and an equivalent PLMN list (Equivalent PLMN list).

The cell satisfies a preset cell reselection criterion.

Attachment or access to the cell is not forbidden.

A tracking area (TA) broadcast by the cell is not in a list of "forbidden TA areas" (list of "Forbidden Tracking Areas").

Further, in some embodiments of this disclosure, the reselection information may be configured by a network device in a source cell in which the terminal is located, or the reselection information is obtained from a historically received message. When the reselection information is configured by the network device, the reselection information may be configured by the source cell (or referred to as a serving cell or a current cell) in which the terminal is located. For example, the reselection information may be configured by the source cell by using radio resource control (RRC) signaling and/or broadcast by using system information. The RRC signaling may be an RRC release (RRC release) message or the like. The system information may be a system information block 2 (System Information Block, SIB2) a SIB4, a SIB5, or the like. In addition, the reselection information in some embodiments of this disclosure may alternatively be obtained from the historically received message. Herein, the historically received message includes but is not limited to RRC signaling and/or system information.

Step 22: Perform a cell reselection procedure based on the per-cell reselection parameter and a reselection condition for reselecting to the neighboring cell.

The performing a cell reselection procedure means that the terminal determines, based on the per-cell reselection parameter and the reselection condition for reselecting to the neighboring cell, whether reselection from the source cell to a target cell can be performed, where the target cell is one of neighboring cells. The source cell may be a cell initially accessed by the terminal, or may be a cell accessed by the terminal in a previous cell reselection procedure. When the source cell is the cell accessed by the terminal in the previous cell reselection procedure, the source cell satisfies all conditions for cell reselection. When the source cell is the cell initially accessed by the terminal, the source cell satisfies at least one of the following conditions:

signal quality of the cell satisfies a preset condition, where signal quality includes reference signal received power (RSRP) and/or reference signal received quality (RSRQ);

the terminal can obtain necessary system information of the cell, for example, a master information block (MIB) and a system information block 1 (SIB1); and a cell bar information element (cellbar IE) in system information of the cell indicates that attachment or access to the cell is not forbidden, where the cellbar IE may be in a barred (Barred) state or a not-barred (notBarred) state.

The per-cell reselection parameter in some embodiments of this disclosure is a parameter that can represent actual network performance of the neighboring cell. The reselection information may further include a per-frequency reselection parameter of the neighboring cell, where the per-frequency reselection parameter is a parameter that can represent network performance of a frequency of the neighboring cell.

Specifically, the per-cell reselection parameter includes at least one of the following parameters: a minimum received signal level parameter, a minimum received signal level offset parameter, a minimum signal quality parameter, a minimum signal quality offset parameter, a power compensation parameter, a measurement offset parameter, a first target offset, a second target offset, a first intermediate quantity related to a received signal level value, a second intermediate quantity related to a signal quality value, and the like. The first target offset is a sum of differences between per-cell parameter values and per-frequency parameter values of at least one of the minimum received signal level parameter, the minimum received signal level offset parameter, the power compensation parameter, and the measurement offset parameter; the second target offset is a sum of differences between per-cell parameter values and per-frequency parameter values of at least one of the minimum signal quality parameter, the minimum signal quality offset parameter, and the measurement offset parameter; the first intermediate quantity is related to a per-cell parameter value of at least one of the minimum received signal level parameter, the minimum received signal level offset parameter, the power compensation parameter, and the measurement offset parameter; and the second intermediate quantity is related to a per-cell parameter value of at least one of the minimum signal quality parameter, the minimum signal quality offset parameter, and the measurement offset parameter.

It should be noted that the reselection information may further include a physical cell identifier (PCI) of the neighboring cell, where the PCI corresponds to the per-cell reselection parameter. Herein, that the PCI corresponds to the per-cell reselection parameter means that one PCI corresponds to one set of per-cell reselection parameters, that is, one set of per-cell reselection parameters corresponds to one neighboring cell and may jointly represent network performance of the neighboring cell. One set of per-cell reselection parameters may include at least one of the plurality of parameters mentioned above.

Herein, the minimum received signal level parameter, the minimum received signal level offset parameter, the minimum signal quality parameter, the minimum signal quality offset parameter, the power compensation parameter, and the measurement offset parameter are all per-cell parameters of the neighboring cell, that is, parameters that can represent actual network performance of the neighboring cell.

The minimum received signal level parameter is a target minimum received signal level value broadcast by the neighboring cell. To be specific, the per-cell reselection parameter configured by the source cell may include a parameter same as a minimum received signal level value of the neighboring cell that is carried in system information broadcast by the neighboring cell, that is, a parameter $Q_{rxlevmin}$* used for cell reselection is a parameter $Q_{rxlevmin}$ of the neighboring cell that is carried in the system information of the neighboring cell. Alternatively, the minimum received signal level parameter may further include a per-frequency minimum received signal level value corresponding to the neighboring cell and a first offset value, where the first offset value is a difference between the target minimum received signal level value and the per-frequency minimum received signal level value. To be specific, the per-cell reselection parameter configured by the source cell may include a per-frequency minimum received signal level value (the parameter $Q_{rxlevmin}$ used for cell reselection) of the frequency of the neighboring cell and the first offset value (an offset between the parameter $Q_{rxlevmin}$ of the neighboring cell that is carried in the system information of the neighboring cell and $Q_{rxlevmin}$ used for cell reselection and broadcast by the source cell).

Likewise, the minimum received signal level offset parameter is a target minimum received signal level offset value broadcast by the neighboring cell. To be specific, the per-cell reselection parameter configured by the source cell may include a parameter same as a minimum received signal level offset value of the neighboring cell that is carried in system information broadcast by the neighboring cell, that is, a parameter $Q_{rxlevminoffset}$* used for cell reselection is a parameter $Q_{rxlevminoffset}$ of the neighboring cell that is carried in the system information of the neighboring cell. Alternatively, the minimum received signal level offset parameter includes a per-frequency minimum received signal level offset value corresponding to the neighboring cell and a second offset value, where the second offset value is a difference between the target minimum received signal level offset value and the per-frequency minimum received signal level offset value. To be specific, the per-cell reselection parameter configured by the source cell may include a per-frequency minimum received signal level offset value (the parameter $Q_{rxlevminoffset}$ used for cell reselection) of the frequency of the neighboring cell and the second offset value (an offset between the parameter $Q_{rxlevminoffset}$ of the neighboring cell that is carried in the system information of the neighboring cell and $Q_{rxlevminoffset}$ used for cell reselection and broadcast by the source cell).

Likewise, the minimum signal quality parameter is a target minimum signal quality value broadcast by the neighboring cell. To be specific, the per-cell reselection parameter configured by the source cell may include a parameter same as a minimum signal quality value of the neighboring cell that is carried in system information broadcast by the neighboring cell, that is, a parameter $Q_{qualmin}$* used for cell reselection is a parameter $Q_{qualmin}$ of the neighboring cell that is carried in the system information of the neighboring cell. Alternatively, the minimum signal quality parameter includes a per-frequency minimum signal quality value corresponding to the neighboring cell and a third offset value, where the third offset value is a difference between the target minimum signal quality value and the per-frequency minimum signal quality value. To be specific, the per-cell reselection parameter configured by the source cell may include a per-frequency minimum signal quality value (the parameter $Q_{qualmin}$ used for cell reselection) and the third offset value (an offset between the parameter $Q_{qualmin}$ of the neighboring cell that is carried in the system information of the neighboring cell and $Q_{qualmin}$ used for cell reselection and broadcast by the source cell).

Likewise, the minimum signal quality offset parameter is a target minimum signal quality offset value broadcast by the neighboring cell. To be specific, the per-cell reselection parameter configured by the source cell may include a parameter same as a minimum signal quality offset value of the neighboring cell that is carried in system information broadcast by the neighboring cell, that is, a parameter $Q_{qualminoffset}$* used for cell reselection is a parameter $Q_{qualminoffset}$ of the neighboring cell that is carried in the system information of the neighboring cell. Alternatively, the minimum signal quality offset parameter includes a per-frequency minimum signal quality offset value corresponding to the neighboring cell and a fourth offset value, where the fourth offset value is a difference between the target minimum signal quality offset value and the per-frequency minimum signal quality offset value. To be specific, the per-cell reselection parameter configured by the source cell may include a per-frequency minimum signal quality offset value (the parameter $Q_{qualminoffset}$ used for cell reselection) of the frequency of the neighboring cell and the fourth offset value (an offset between the parameter $Q_{qualminoffset}$ of the neighboring cell that is carried in the system information of the neighboring cell and $Q_{qualminoffset}$ used for cell reselection and broadcast by the source cell).

Further, the measurement offset parameter includes a connection failure offset parameter (connEstFailOffset) and/or a cell temporary offset parameter ($Qoffset_{temp}$). The measurement offset parameter is a target measurement offset value broadcast by the neighboring cell. To be specific, the per-cell reselection parameter configured by the source cell may include a parameter same as a measurement offset of the neighboring cell that is carried in system information broadcast by the neighboring cell, that is, a parameter connEstFailOffset* or $Qoffset_{temp}$* used for cell reselection is a parameter connEstFailOffset or $Qoffset_{temp}$ of the neighboring cell that is carried in the system information of the neighboring cell. Alternatively, the measurement offset parameter includes a per-frequency measurement offset value corresponding to the neighboring cell and a fifth offset value, where the fifth offset value is an offset between the target measurement offset value and the per-frequency measurement offset value. To be specific, the per-cell reselection parameter configured by the source cell may include a per-frequency measurement offset (such as the parameter connEstFailOffset or $Qoffset_{temp}$ used for cell reselection) of the frequency of the neighboring cell and the fifth offset value (an offset between the parameter connEstFailOffset or $Qoffset_{temp}$ of the neighboring cell that is carried in the system information of the neighboring cell and connEstFailOffset or $Qoffset_{temp}$ used for cell reselection and broadcast by the source cell).

Further, the power compensation parameter is determined based on a maximum power parameter $P_{Max}$ and a power class parameter $P_{PowerClass}$. The maximum power parameter is a target maximum power value corresponding to the neighboring cell. To be specific, the per-cell reselection parameter configured by the source cell may include a parameter same as a maximum power value of the neighboring cell that is carried in system information broadcast by the neighboring cell, that is, a parameter $P_{Max}*$ used for cell reselection is a parameter $P_{Max}$ of the neighboring cell that is carried in the system information of the neighboring cell. Alternatively, the maximum power parameter includes a per-frequency maximum power value corresponding to the frequency of the neighboring cell and a sixth offset value, where the sixth offset value is a difference between the target maximum power value and the per-frequency maximum power value. To be specific, the per-cell reselection parameter configured by the source cell may include a per-frequency maximum power value (the parameter $P_{Max}$ used for cell reselection) of the frequency of the neighboring cell and the sixth offset value (an offset between the parameter $P_{Max}$ of the neighboring cell that is carried in the system information of the neighboring cell and $P_{Max}$ used for cell reselection and broadcast by the source cell).

The foregoing briefly describes parameters such as the minimum received signal level parameter, the minimum received signal level offset parameter, the minimum signal quality parameter, the minimum signal quality offset parameter, the power compensation parameter, and the measurement offset parameter. The following further describes how to perform cell reselection based on the parameters in this embodiment.

Specifically, step 22 may include:

A1. Calculate a cell-selection received signal level value Srxlev of the neighboring cell based on a measured received signal level value and at least one of the minimum received signal level parameter, the minimum received signal level offset parameter, the power compensation parameter, and the measurement offset parameter in the selection parameter. Herein, the minimum received signal level parameter, the minimum received signal level offset parameter, the power compensation parameter, and the measurement offset parameter are per-cell parameters of the neighboring cell and may represent network performance of the neighboring cell. For example, the terminal may calculate the cell-selection received signal level value Srxlev by referring to the following formula:

$$Srxlev=Q_{rxlevmeas}-(Q_{rxlevmin}+Q_{rxlevminoffset})-P_{compensation}-Qoffset_{temp},$$

where Srxlev indicates the cell-selection received signal level value of the neighboring cell, $Q_{rxlevmeas}$ indicates an actually measured received signal level value of the neighboring cell, $Q_{rxlevmin}$ indicates an actual value of the minimum received signal level parameter of the neighboring cell, $Q_{rxlevminoffset}$ indicates an actual value of the minimum received signal level offset parameter of the neighboring cell, $P_{compensation}$ indicates an actual value of the power compensation parameter of the neighboring cell, and $Qoffset_{temp}$ indicates an actual value of the measurement offset parameter of the neighboring cell.

It should be noted that the foregoing formula is used in a calculation scenario in which all of the minimum received signal level parameter, the minimum received signal level offset parameter, the power compensation parameter, and the measurement offset parameter exist. When some values of the parameters are default, the corresponding parameters in the formula may be set to special values, where the special values are prescribed.

B1. Calculate a cell-selection signal quality value of the neighboring cell based on a measured received signal quality value and at least one of the minimum signal quality parameter, the minimum signal quality offset parameter, and the measurement offset parameter in the selection parameter. Herein, the minimum signal quality parameter, the minimum signal quality offset parameter, and the measurement offset parameter are per-cell parameters of the neighboring cell and may represent network performance of the neighboring cell. For example, the terminal may calculate the cell-selection received signal quality value Squal by referring to the following formula:

$$Squal=Q_{qualmeas}-(Q_{qualmin}+Q_{qualminoffset})-Qoffset_{temp},$$

where Squal indicates the cell-selection signal quality value of the neighboring cell, $Q_{qualmeas}$ indicates an actually measured signal quality value of the neighboring cell, $Q_{qualmin}$ indicates an actual value of the minimum signal quality parameter of the neighboring cell, $Q_{qualminoffset}$ indicates an actual value of the minimum signal quality offset parameter of the neighboring cell, and $Qoffset_{temp}$ indicates the actual value of the measurement offset parameter of the neighboring cell.

It should be noted that the foregoing formula is used in a calculation scenario in which all of the minimum signal quality parameter, the minimum signal quality offset parameter, and the measurement offset parameter exist. When some values of the parameters are default, the corresponding parameters in the formula may be set to special values, where the special values are prescribed.

C1. Perform the cell reselection procedure based on the cell-selection received signal level value, the cell-selection signal quality value, and the reselection condition for reselecting to the neighboring cell.

In addition, the per-cell reselection parameter in some embodiments of this disclosure may further include the first target offset and the second target offset. The first target offset is the sum of the differences between the per-cell parameter values and the per-frequency parameter values of the at least one of the minimum received signal level parameter, the minimum received signal level offset parameter, the power compensation parameter, and the measurement offset parameter; and the second target offset is the sum of the differences between the per-cell parameter values and the per-frequency parameter values of the at least one of the minimum signal quality parameter, the minimum signal quality offset parameter, and the measurement offset parameter.

In some embodiments, the terminal may further perform cell reselection based on the first target offset and the second target offset. Specifically, step 22 may further include:

A2. Calculate a cell-selection received signal level value of the neighboring cell based on a measured received signal level value, a first target parameter value, and the first target offset, where the first target parameter value is the per-frequency parameter value of the at least one of the minimum received signal level parameter, the minimum received signal level offset parameter, the power compensation parameter, and the measurement offset parameter. For example, the terminal may calculate the cell-selection received signal level value Srxlev by referring to the following formula:

$$Srxlev=Q_{rxlevmeas}-(Q_{rxlevmin}+Q_{rxlevminoffset})-P_{compensation}-Qoffset_{temp}-offset1,$$

where Srxlev indicates the cell-selection received signal level value of the neighboring cell, $Q_{rxlevmeas}$ indicates an actually measured value of the received signal level parameter of the neighboring cell, $Q_{rxlevmin}$ indicates a value of the minimum received signal level parameter of the frequency of the neighboring cell, $Q_{rxlevminoffset}$ indicates a value of the minimum received signal level offset parameter of the frequency of the neighboring cell, $P_{compensation}$ indicates a value of the power compensation parameter of the frequency of the neighboring cell, $Qoffset_{temp}$ indicates a value of the measurement offset parameter of the frequency of the neighboring cell, and offset1 indicates the first target parameter value.

It should be noted that offset1 may be the sum of the differences between the per-cell values and the per-frequency values of the at least one of the minimum received signal level parameter, the minimum received signal level offset parameter, the power compensation parameter, and the measurement offset parameter. When values of some parameters in the foregoing formula are default, the parameters may be set to special values.

B2. Calculate a cell-selection signal quality value of the neighboring cell based on a measured received signal quality value, a second target parameter value, and the second target offset, where the second target parameter value is the per-frequency parameter value of the at least one of the minimum signal quality parameter, the minimum signal quality offset parameter, and the measurement offset parameter. For example, the terminal may calculate the cell-selection received signal quality value Squal by referring to the following formula:

$$\text{Squal} = Q_{qualmeas} - (Q_{qualmin} + Q_{qualminoffset}) - Qoffset_{temp} - \text{offset2},$$

where Squal indicates the cell-selection signal quality value of the neighboring cell, $Q_{qualmeas}$ indicates an actually measured value of the signal quality parameter of the neighboring cell, $Q_{qualmin}$ indicates a value of the minimum signal quality parameter of the frequency of the neighboring cell, $Q_{qualminoffset}$ indicates a value of the minimum signal quality offset parameter of the frequency of the neighboring cell, $Qoffset_{temp}$ indicates the value of the measurement offset parameter of the frequency of the neighboring cell, and offset2 indicates the second target parameter value.

It should be noted that offset2 may be the sum of the differences between the per-cell values and the per-frequency values of the at least one of the minimum signal quality parameter, the minimum signal quality offset parameter, and the measurement offset parameter. When values of some parameters in the foregoing formula are default, the parameters may be set to special values.

C2. Perform the cell reselection procedure based on the cell-selection received signal level value, the cell-selection signal quality value, and the reselection condition for reselecting to the neighboring cell.

In addition, the per-cell reselection parameter in some embodiments of this disclosure may further include the first intermediate quantity and the second intermediate quantity. The first intermediate quantity is related to the per-cell parameter value of the at least one of the minimum received signal level parameter, the minimum received signal level offset parameter, the power compensation parameter, and the measurement offset parameter; and the second intermediate quantity is related to the per-cell parameter value of the at least one of the minimum signal quality parameter, the minimum signal quality offset parameter, and the measurement offset parameter.

In some embodiments, the terminal may further perform cell reselection based on the first intermediate quantity and the second intermediate quantity. Specifically, step 22 may further include:

A3. Calculate a cell-selection received signal level value of the neighboring cell based on a measured received signal level value and the first intermediate quantity. For example, the terminal may calculate the cell-selection received signal level value Srxlev by referring to the following formula:

$$\text{Srxlev} = Q_{rxlevmeas} - \text{offset3},$$

where Srxlev indicates the cell-selection received signal level value of the neighboring cell, $Q_{rxlevmeas}$ indicates an actually measured received signal level value of the neighboring cell, and offset3 indicates a result of $(Q_{rxlevmin} + Q_{rxlevminoffset}) - P_{compensation} - Qoffset_{temp}$, which is obtained through calculation by using parameter values of the neighboring cell that are carried in the system information of the neighboring cell.

B3. Calculate a cell-selection signal quality value of the neighboring cell based on a measured received signal quality value and the second intermediate quantity. For example, the terminal may calculate the cell-selection received signal quality value Squal by referring to the following formula:

$$\text{Squal} = Q_{qualmeas} - \text{offset4},$$

where Squal indicates the cell-selection signal quality value of the neighboring cell, $Q_{qualmeas}$ indicates an actually measured signal quality value of the neighboring cell, and offset4 indicates a result of $(Q_{qualmin} + Q_{qualminoffset}) - Qoffset_{temp}$, which is obtained through calculation by using parameter values of the neighboring cell that are carried in the system information of the neighboring cell.

C3. Perform the cell reselection procedure based on the cell-selection received signal level value, the cell-selection signal quality value, and the reselection condition for reselecting to the neighboring cell.

Further, the cell reselection procedure includes: the terminal compares priorities of neighboring cells with a priority of the source cell to obtain a priority comparison result; the terminal determines, based on the priority comparison result, a target reselection condition for reselecting to the neighboring cell; and when the target reselection condition is satisfied, the terminal reselects from the source cell to a target cell, where the target cell is one of the neighboring cells; or when the target reselection condition is not satisfied, the terminal does not perform cell reselection. The terminal may reselect to a high-priority cell, a low-priority cell, or a same-priority cell. The high-priority cell (or referred to as a high-priority frequency), the same-priority cell (or referred to as a same-priority frequency), and the low-priority cell (or referred to as a low-priority frequency) are a result of comparing the priorities of the neighboring cells with the priority of the source cell, that is, obtained by the terminal by comparing the priorities of the neighboring cells that are received from a network device side and calculated, with the priority of the source cell. If a target priority of a neighboring cell is higher than the priority of the source cell, the neighboring cell is a high-priority cell. If a target priority of a neighboring cell is lower than the priority of the source cell, the neighboring cell is a low-priority cell. If a target priority of a neighboring cell is the same as the priority of the source cell, the neighboring cell is a same-priority cell. For example, the source cell of the terminal is an LTE cell, and a priority of an NR cell is received; the source cell of the terminal is an NR cell, and a priority of an LTE cell is received; or the terminal receives both a priority of an NR cell and a priority of an LTE cell. The terminal compares the priority of the source cell of the terminal with the received priority of the neighboring cell, and determines that the neighboring cell is a high-priority cell, a same-priority cell, or a low-priority cell.

The following further describes cell reselection with reference to different scenarios.

Scenario 1: The priority of the neighboring cell is the same as the priority of the source cell, or the neighboring cell and the source cell are on the same frequency.

In this scenario, steps C1, C2, and C3 may be implemented in the following manners:

D1. In a case in which the priorities of the neighboring cells are the same as the priority of the source cell or the neighboring cells and the source cell are on the same frequency, if the cell-selection received signal level values and the cell-selection signal quality values are all greater than 0, rank the source cell and the neighboring cells. To be specific, if an S criterion is satisfied, that is, Srxlev>0 and Squal>0, the source cell and the neighboring cells are ranked based on an R criterion.

The source cell and the neighboring cells are ranked by using the following formula:

Rank $Rs$ of the source cell=$Q_{meas,s}+Q_{Hyst}-Q$offset$_{temp}$; and

Rank $Rn$ of the neighboring cell=$Q_{meas,n}+Q$offset−$Q$offset$_{temp}$;

where $Q_{meas,s}$ is a measurement value of reference signal received power RSRP of the source cell, $Q_{Hyst}$ is a measurement hysteresis of the source cell, Qoffset$_{temp}$ is a measurement offset of the source cell, $Q_{meas,n}$ is a measurement value of RSRP of the neighboring cell, Qoffset is a first measurement offset of the neighboring cell, and Qoffset$_{temp}$ is a second measurement offset of the neighboring cell.

D21. If the source cell does not provide a rank threshold, reselect from the source cell to a best ranked cell in the neighboring cells. The rank threshold may be a rangeToBestCell parameter. If the network device (the source cell) does not configure the rangeToBestCell parameter, and a basic reselection condition is satisfied, the terminal initiates a cell reselection procedure to the best ranked cell.

Alternatively, D22. If the source cell provides a rank threshold, reselect from the source cell to one of first cells that has a largest quantity of beams whose quality is higher than a threshold, where the first cell is a cell with a difference between a rank thereof and a rank of a best ranked cell in the neighboring cells being less than the rank threshold. If the source cell is configured with the rangeToBestCell parameter, and the basic reselection condition is satisfied, the terminal selects, from cells with differences between ranks thereof and the rank of the best ranked cell in all the neighboring cells being not greater than rangeToBestCell, a cell that has a largest quantity of beams whose quality is higher than a threshold, and initiates a cell reselection procedure.

The basic reselection condition includes but is not limited to the following: The ranks of the neighboring cells in a reselection time interval Treselection$_{RAT}$ are all better than that of the source cell, and a camping time of the terminal on the current source cell exceeds a preset threshold, such as 1s.

It should be noted that a same-priority neighboring cell and the source cell may be inter-frequency cells, intra-system cells, or inter-system cells. This is not specifically limited in some embodiments of this disclosure.

The cell reselection procedure further includes the following scenario in addition to the foregoing reselection scenario in which the source cell and the neighboring cell have a same priority:

Scenario 2: The priority of the neighboring cell is lower than the priority of the source cell.

In a case in which the priority of the neighboring cell is lower than the priority of the source cell, if a first parameter of the source cell is lower than a first preset threshold, and a second parameter of the neighboring cell exceeds a second preset threshold, the terminal reselects from the source cell to the neighboring cell.

Specifically, in this scenario, when the source cell provides Thresh$_{Serving,LowQ}$ corresponding to Squal of the source cell, if Squal of the source cell is less than Thresh$_{Serving,LowQ}$, and Squal of the neighboring cell is greater than Thresh$_{X,LowQ}$ or Srxlev of the neighboring cell is greater than Thresh$_{X,LowP}$ in a reselection time period Treselection$_{RAT}$, the terminal reselects from the source cell to the neighboring cell. To be specific, if the system broadcasts the thresh$_{Serving,LowQ}$ parameter, and the terminal has camped on the source cell for more than one second, if Squal of the serving cell is less than Thresh$_{Serving,LowQ}$, and Squal of a cell on a low-priority NR/LTE frequency is greater than Thresh$_{X,LowQ}$ in a time interval Treselection$_{RAT}$, the terminal initiates reselection to the neighboring cell on the low-priority frequency.

Alternatively, when the source cell does not provide Thresh$_{Serving,LowQ}$ corresponding to Squal of the source cell, if Srxlev of the source cell is less than Thresh$_{Serving,LowP}$, and Srxlev of the neighboring cell is greater than Thresh$_{X,LowP}$ in a reselection time period Treselection$_{RAT}$, the terminal reselects from the source cell to the neighboring cell. To be specific, if the system does not broadcast the thresh$_{Serving,LowQ}$ parameter, but the terminal has camped on the source cell for more than one second, and Srxlev of the serving cell is less than Thresh$_{Serving,LowP}$, and Srxlev of a cell on a low-priority NR/LTE frequency is greater than Thresh$_{X,LowP}$ in a time interval Treselection$_{RAT}$, the terminal initiates reselection to the neighboring cell on the low-priority frequency.

For definitions of the foregoing parameters, refer to the following descriptions. Squal is a cell-selection signal quality value, Srxlev is a cell-selection received signal level value, Thresh$_{Serving,LowQ}$ is a Squal threshold of the source cell, Thresh$_{Serving,LowP}$ is an Srxlev threshold of the source cell, Thresh$_{X,LowQ}$ is a Squal threshold of the neighboring cell, and Thresh$_{X,LowP}$ is an Srxlev threshold of the neighboring cell.

Scenario 3: The priority of the neighboring cell is higher than the priority of the source cell.

In a case in which the target priority of the neighboring cell is higher than the priority of the source cell, if a second parameter of the neighboring cell exceeds a second preset threshold, the terminal reselects from the source cell to the neighboring cell.

In this scenario, when the source cell provides Thresh$_{Serving,LowQ}$ corresponding to Squal of the source cell, if Squal of the neighboring cell is greater than Thresh$_{X,HighQ}$ in a reselection time period Treselection$_{RAT}$, the terminal reselects from the source cell to the neighboring cell. To be specific, if the system broadcasts the thresh$_{Serving,LowQ}$ parameter, and the terminal has camped on the current source cell for more than one second, if signal quality Squal of a cell on a high-priority NR/LTE frequency is greater than Thresh$_{X,HighQ}$ in a time interval Treselection$_{RAT}$, the terminal initiates reselection to the neighboring cell on the high-priority frequency.

Alternatively, when the source cell does not provide Thresh$_{Serving,LowQ}$ corresponding to Squal of the source cell, if Srxlev of the neighboring cell is greater than Thresh$_{X,HighP}$ in a reselection time period Treselection$_{RAT}$, the terminal reselects from the source cell to the neighboring cell. To be specific, if the system does not broadcast the thresh$_{Serving,LowQ}$ parameter, but the terminal has camped on the source cell for more than one second, and Srxlev of a cell on a high-priority frequency is greater than $\text{Thresh}_{X,HighP}$ in a time interval or reselection time period $\text{Treselection}_{RAT}$, the terminal initiates reselection to the neighboring cell on the high-priority frequency.

For the foregoing parameters, refer to the following explanations: Squal is a cell-selection signal quality value, Srxlev is a cell-selection received signal level value, $\text{Thresh}_{Serving,LowQ}$ is a Squal threshold of the source cell, $\text{Thresh}_{X,HighQ}$ is a Squal threshold of the neighboring cell, and $\text{Thresh}_{X,HighP}$ is an Srxlev threshold of the neighboring cell.

The reselection information further includes priority information used to indicate the priority of the neighboring cell. The priority information may include base priority information. Assuming that upper limits of frequency priorities corresponding to an LTE cell and an NR cell are different, the base priority information is used to indicate that a frequency priority corresponding to the LTE cell is an integer from 0 to 7, or indicate that a frequency priority corresponding to the NR cell is an integer from 0 to 9. In addition, the priority information may further include base priority information and sub-priority information, where a value granularity of the sub-priority information is less than a value granularity of the base priority information. Assuming that upper limits of frequency priorities corresponding to an LTE cell and an NR cell are the same, the base priority information is used to indicate that a frequency priority corresponding to the LTE cell or the NR cell is an integer from 0 to 7. Further, the sub-priority information may include one level of sub-priority information whose value granularity is less than that of a base priority (the value granularity is 1). For example, the sub-priority information is used to indicate one value of sub-priorities {0.2, 0.4, 0.6, 0.8} or {0.1, 0.2, 0.3, 0.4, 0.5, 0.6, 0.7, 0.8, 0.9} that correspond to the NR cell and have a 0.1 value granularity. Alternatively, the sub-priority information may further include at least two levels of sub-priority information with different value granularities. For example, the sub-priority information may indicate one value of sub-priorities {0.2, 0.4, 0.6, 0.8} or {0.1, 0.2, 0.3, 0.4, 0.5, 0.6, 0.7, 0.8, 0.9} that correspond to the NR cell and have a 0.1 value granularity, and one value of sub-priorities {0.01, 0.02, 0.03, 0.04, 0.05, 0.06, 0.07, 0.08, 0.09} that have a 0.01 value granularity. It should be noted that the value granularities 1, 0.1, and 0.01 in some embodiments of this disclosure are examples for description only, and other value granularities in decimal value ranges may also be applied to some embodiments of this disclosure, and specific decimal value ranges of the value granularities may be prescribed by a protocol, configured by the network device, or determined by the network device and the terminal through negotiation.

In the cell reselection method in some embodiments of this disclosure, the terminal can obtain the per-cell reselection parameter of the neighboring cell, and perform cell reselection based on the per-cell reselection parameter. This can ensure that quality of the reselected cell satisfies a camping requirement, and avoid a problem of connection instability of the terminal after cell reselection.

The cell reselection method in different scenarios is separately described in detail in the foregoing embodiments. A terminal corresponding to the cell reselection method is further described in the following embodiments with reference to an accompanying drawing.

Figure 3:
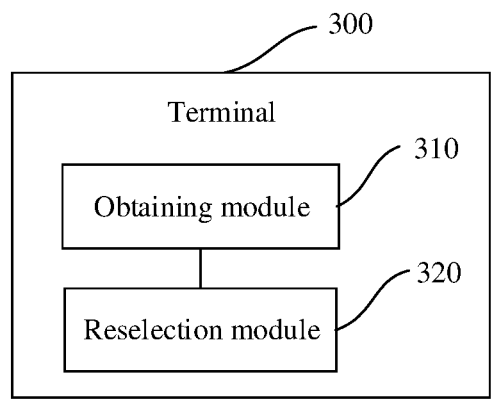
FIG. 3 presents a schematic modular structural diagram of a terminal according to some embodiments of this disclosure.

As shown in FIG. 3, a terminal 300 in some embodiments of this disclosure can implement details of the method in the foregoing embodiments, that is, obtaining reselection information related to cell reselection, where the reselection information includes a per-cell reselection parameter of a neighboring cell; and performing a cell reselection procedure based on the per-cell reselection parameter and a reselection condition for reselecting to the neighboring cell, and can achieve a same effect. The terminal 300 specifically includes the following functional modules:

an obtaining module 310, configured to obtain reselection information related to cell reselection, where the reselection information includes a per-cell reselection parameter of a neighboring cell; and a reselection module 320, configured to perform a cell reselection procedure based on the per-cell reselection parameter and a reselection condition for reselecting to the neighboring cell.

The reselection information is configured by a network device in a source cell in which the terminal is located, or the reselection information is obtained from a historically received message.

The per-cell reselection parameter includes at least one of the following parameters:
    a minimum received signal level parameter;
    a minimum received signal level offset parameter;
    a minimum signal quality parameter;
    a minimum signal quality offset parameter;
    a power compensation parameter;
    a measurement offset parameter;
    a first target offset, where the first target offset is a sum of differences between per-cell parameter values and per-frequency parameter values of at least one of a minimum received signal level parameter, a minimum received signal level offset parameter, a power compensation parameter, and a measurement offset parameter;
    a second target offset, where the second target offset is a sum of differences between per-cell parameter values and per-frequency parameter values of at least one of a minimum signal quality parameter, a minimum signal quality offset parameter, and a measurement offset parameter;
    a first intermediate quantity related to a received signal level value, where the first intermediate quantity is related to a per-cell parameter value of at least one of a minimum received signal level parameter, a minimum received signal level offset parameter, a power compensation parameter, and a measurement offset parameter; and
    a second intermediate quantity related to a signal quality value, where the second intermediate quantity is related to a per-cell parameter value of at least one of a minimum signal quality parameter, a minimum signal quality offset parameter, and a measurement offset parameter.

The minimum received signal level parameter is a target minimum received signal level value broadcast by the neighboring cell; or the minimum received signal level parameter includes a per-frequency minimum received signal level value corresponding to the neighboring cell and a first offset value, where the first offset value is a difference between the target minimum received signal level value and the per-frequency minimum received signal level value.

The minimum received signal level offset parameter is a target minimum received signal level offset value broadcast by the neighboring cell; or the minimum received signal level offset parameter includes a per-frequency minimum received signal level offset value corresponding to the neighboring cell and a second offset value, where the second offset value is a difference between the target minimum received signal level offset value and the per-frequency minimum received signal level offset value.

The minimum signal quality parameter is a target minimum signal quality value broadcast by the neighboring cell; or the minimum signal quality parameter includes a per-frequency minimum signal quality value corresponding to the neighboring cell and a third offset value, where the third offset value is a difference between the target minimum signal quality value and the per-frequency minimum signal quality value.

The minimum signal quality offset parameter is a target minimum signal quality offset value broadcast by the neighboring cell; or the minimum signal quality offset parameter includes a per-frequency minimum signal quality offset value corresponding to the neighboring cell and a fourth offset value, where the fourth offset value is a difference between the target minimum signal quality offset value and the per-frequency minimum signal quality offset value.

The measurement offset parameter is a target measurement offset value broadcast by the neighboring cell; or the measurement offset parameter includes a per-frequency measurement offset value corresponding to the neighboring cell and a fifth offset value, where the fifth offset value is an offset between the target measurement offset value and the per-frequency measurement offset value.

The measurement offset parameter includes a connection failure offset parameter and/or a cell temporary offset parameter.

The power compensation parameter is determined based on a maximum power parameter and a power class parameter.

The maximum power parameter is a target maximum power value corresponding to the neighboring cell; or the maximum power parameter includes a per-frequency maximum power value corresponding to the neighboring cell and a sixth offset value, where the sixth offset value is a difference between the target maximum power value and the per-frequency maximum power value.

The reselection module 320 includes:

a first calculation submodule, configured to calculate a cell-selection received signal level value of the neighboring cell based on a measured received signal level value and at least one of the minimum received signal level parameter, the minimum received signal level offset parameter, the power compensation parameter, and the measurement offset parameter in the selection parameter;

a second calculation submodule, configured to calculate a cell-selection signal quality value of the neighboring cell based on a measured received signal quality value and at least one of the minimum signal quality parameter, the minimum signal quality offset parameter, and the measurement offset parameter in the selection parameter; and a reselection submodule, configured to perform the cell reselection procedure based on the cell-selection received signal level value, the cell-selection signal quality value, and the reselection condition for reselecting to the neighboring cell.

The reselection module 320 includes:

a third calculation submodule, configured to calculate a cell-selection received signal level value of the neighboring cell based on a measured received signal level value, a first target parameter value, and the first target offset, where the first target parameter value is the per-frequency parameter value of the at least one of the minimum received signal level parameter, the minimum received signal level offset parameter, the power compensation parameter, and the measurement offset parameter;

a fourth calculation submodule, configured to calculate a cell-selection signal quality value of the neighboring cell based on a measured received signal quality value, a second target parameter value, and the second target offset, where the second target parameter value is the per-frequency parameter value of the at least one of the minimum signal quality parameter, the minimum signal quality offset parameter, and the measurement offset parameter; and a reselection submodule, configured to perform the cell reselection procedure based on the cell-selection received signal level value, the cell-selection signal quality value, and the reselection condition for reselecting to the neighboring cell.

The reselection module 320 includes:

a fifth calculation submodule, configured to calculate a cell-selection received signal level value of the neighboring cell based on a measured received signal level value and the first intermediate quantity;

a sixth calculation submodule, configured to calculate a cell-selection signal quality value of the neighboring cell based on a measured received signal quality value and the second intermediate quantity; and a reselection submodule, configured to perform the cell reselection procedure based on the cell-selection received signal level value, the cell-selection signal quality value, and the reselection condition for reselecting to the neighboring cell.

The reselection submodule includes:

a ranking unit, configured to: in a case in which neighboring cells have a same priority as the source cell or neighboring cells are on a same frequency as the source cell, if the cell-selection received signal level values and the cell-selection signal quality values are all greater than 0, rank the source cell and the neighboring cells; and a first reselection unit, configured to: if the source cell does not provide a rank threshold, reselect from the source cell to a best ranked cell in the neighboring cells; or a second reselection unit, configured to: if the source cell provides a rank threshold, reselect from the source cell to one of first cells that has a largest quantity of beams whose quality is higher than a threshold, where the first cell is a cell with a difference between a rank thereof and a rank of a best ranked cell in the neighboring cells being less than or equal to the rank threshold.

The reselection submodule includes:

a third reselection unit, configured to: in a case in which a priority of the neighboring cell is lower than a priority of the source cell, when the source cell provides $Thresh_{Serving,LowQ}$ corresponding to Squal of the source cell, if Squal of the source cell is less than $Thresh_{Serving,LowQ}$, and Squal of the neighboring cell is greater than $Thresh_{X,LowQ}$ or Srxlev of the neighboring cell is greater than $Thresh_{X,LowP}$ in a reselection time period $Treselection_{RAT}$, reselect from the source cell to the neighboring cell; or a fourth reselection unit, configured to: when the source cell does not provide $Thresh_{Serving,LowQ}$ corresponding to Squal of the source cell, if Srxlev of the source cell is less than $Thresh_{Serving,LowP}$, and Srxlev of the neighboring cell is greater than $Thresh_{X,LowP}$ in a reselection time period $Treselection_{RAT}$, reselect from the source cell to the neighboring cell; where Squal is a cell-selection signal quality value, Srxlev is a cell-selection received signal level value, $Thresh_{Serving,LowQ}$ is a Squal threshold of the source cell, $Thresh_{Serving,LowP}$ is an Srxlev threshold of the source cell, $Thresh_{X,LowQ}$ is a Squal threshold of the neighboring cell, and $Thresh_{X,LowP}$ is an Srxlev threshold of the neighboring cell.

The reselection submodule includes:

a fifth reselection unit, configured to: in a case in which a priority of the neighboring cell is higher than a priority of the source cell, when the source cell provides $Thresh_{Serving,LowQ}$ corresponding to Squal of the source cell, if Squal of the neighboring cell is greater than $Thresh_{X,HighQ}$ in a reselection time period $Treselection_{RAT}$, reselect from the source cell to the neighboring cell; or a sixth reselection unit, configured to: when the source cell does not provide $Thresh_{Serving,LowQ}$ corresponding to Squal of the source cell, if Srxlev of the neighboring cell is greater than $Thresh_{X,HighP}$ in a reselection time period $Treselection_{RAT}$, reselect from the source cell to the neighboring cell; where Squal is a cell-selection signal quality value, Srxlev is a cell-selection received signal level value, $Thresh_{Serving,LowQ}$ is a Squal threshold of the source cell, $Thresh_{X,HighQ}$ is a Squal threshold of the neighboring cell, and $Thresh_{X,HighP}$ is an Srxlev threshold of the neighboring cell.

The reselection information further includes a physical cell identifier PCI of the neighboring cell, and the PCI corresponds to the per-cell reselection parameter.

The reselection information further includes priority information used to indicate a priority of the neighboring cell.

The priority information includes base priority information; or the priority information includes base priority information and sub-priority information, where a value granularity of the sub-priority information is less than a value granularity of the base priority information.

It should be noted that the terminal in some embodiments of this disclosure can obtain the per-cell reselection parameter of the neighboring cell, and perform cell reselection based on the per-cell reselection parameter. This can ensure that quality of the reselected cell satisfies a camping requirement, and avoid a problem of connection instability of the terminal after cell reselection.

Figure 4:
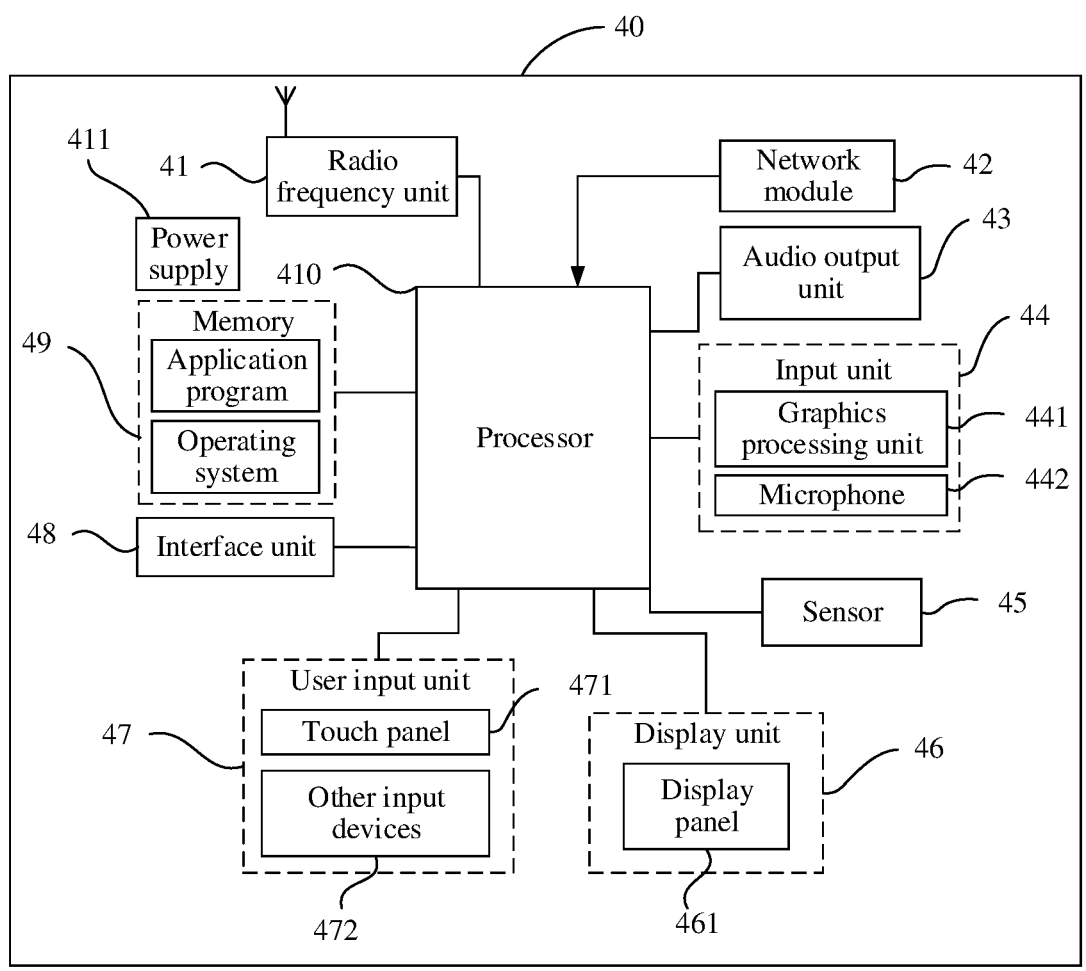
FIG. 4 presents a block diagram of a terminal according to some embodiments of this disclosure.

To better achieve the foregoing objective, further, FIG. 4 is a schematic diagram of a hardware structure of a terminal for implementing each embodiment of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute a limitation on the terminal. A quantity of components included in the terminal may be greater or less than that shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 41 is configured to obtain reselection information related to cell reselection, where the reselection information includes a per-cell reselection parameter of a neighboring cell.

The processor 410 is configured to perform a cell reselection procedure based on the per-cell reselection parameter and a reselection condition for reselecting to the neighboring cell.

The terminal in some embodiments of this disclosure can obtain the per-cell reselection parameter of the neighboring cell, and perform cell reselection based on the per-cell reselection parameter. This can ensure that quality of the reselected cell satisfies a camping requirement, and avoid a problem of connection instability of the terminal after cell reselection.

It should be understood that in some embodiments of this disclosure, the radio frequency unit 41 may be configured to: receive and send signals in an information receiving/sending process or a call process; and specifically, after receiving downlink data from a base station, send the downlink data to the processor 410 for processing, and in addition, send uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may further communicate with a network and another device through a wireless communications system.

The terminal provides wireless broadband internet access for a user by using the network module 42, for example, helps the user send and receive e-mails, browse web pages, and access streaming media.

The audio output unit 43 may convert audio data received by the radio frequency unit 41 or the network module 42 or stored in the memory 49 into an audio signal, and output the audio signal as a sound. In addition, the audio output unit 43 may further provide audio output (for example, a call signal reception tone or a message reception tone) that is related to a specific function performed by the terminal 40. The audio output unit 43 includes a speaker, a buzzer, a telephone receiver, and the like.

The input unit 44 is configured to receive an audio or video signal. The input unit 44 may include a graphics processing unit (GPU) 441 and a microphone 442. The graphics processing unit 441 processes image data of a static picture or a video that is obtained by an image capture apparatus (for example, a camera) in a video capture mode or an image capture mode. A processed image frame may be displayed on the display unit 46. An image frame processed by the graphics processing unit 441 may be stored in the memory 49 (or another storage medium) or sent by the radio frequency unit 41 or the network module 42. The microphone 442 can receive a sound and can process the sound into audio data. The processed audio data may be converted in a telephone call mode into a format that can be sent by the radio frequency unit 41 to a mobile communications base station, for outputting.

The terminal 40 further includes at least one sensor 45, for example, an optical sensor, a motion sensor, and another sensor. Specifically, the optical sensor includes an ambient light sensor and a proximity sensor. The ambient light sensor may adjust brightness of a display panel 461 based on intensity of ambient light. When the terminal 40 moves near an ear, the proximity sensor may disable the display panel 461 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 45 may further include a fingerprint sensor, a pressure sensor, an iris sensor, a molecular sensor, a gyroscope, a barometer, a hygrometer, a thermometer, or an infrared sensor. Details are not described herein.

The display unit 46 is configured to display information input by the user or information provided for the user. The display unit 46 may include the display panel 461. The display panel 461 may be configured in a form of a liquid crystal display (LCD), an organic light-emitting diode (OLED), or the like.

The user input unit 47 may be configured to receive input digit or character information, and generate a key signal input related to a user setting and function control of the terminal. Specifically, the user input unit 47 includes a touch panel 471 and other input devices 472. The touch panel 471, also referred to as a touchscreen, may capture a touch operation performed by the user on or near the touch panel (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 410, and receives and executes a command sent by the processor 410. In addition, the touch panel 471 may be implemented in a plurality of forms, for example, a resistive, capacitive, infrared, or surface acoustic wave touch panel. The user input unit 47 may further include the other input devices 472 in addition to the touch panel 471. Specifically, the other input devices 472 may include but are not limited to a physical keyboard, a function key (such as a volume control key or a power on/off key), a trackball, a mouse, a joystick, and the like. Details are not described herein.

Further, the touch panel 471 may cover the display panel 461. After detecting a touch operation on or near the touch panel 471, the touch panel 471 transmits the touch operation to the processor 410 to determine a type of a touch event. Then the processor 410 provides corresponding visual output on the display panel 461 based on the type of the touch event. In FIG. 4, the touch panel 471 and the display panel 461 serve as two independent components to implement input and output functions of the terminal. However, in some embodiments, the touch panel 471 and the display panel 461 may be integrated to implement the input and output functions of the terminal. This is not specifically limited herein.

The interface unit 48 is an interface for connecting an external apparatus to the terminal 40. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 48 may be configured to receive input (for example, data information and electric power) from the external apparatus, and transmit the received input to one or more elements in the terminal 40; or may be configured to transmit data between the terminal 40 and the external apparatus.

The memory 49 may be configured to store a software program and various data. The memory 49 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 49 may include a high-speed random access memory, or may include a non-volatile memory, for example, at least one magnetic disk storage device, a flash memory device, or other volatile solid-state storage devices.

The processor 410 is a control center of the terminal, connects various parts of the entire terminal by using various interfaces and lines, and executes various functions and data processing of the terminal by running or executing a software program and/or a module stored in the memory 49 and invoking data stored in the memory 49, so as to perform overall monitoring on the terminal. The processor 410 may include one or more processing units. Optionally, the processor 410 may integrate an application processor and a modem processor. The application processor mainly processes the operating system, a user interface, the application program, and the like. The modem processor mainly processes wireless communication. It may be understood that the modem processor may alternatively not be integrated into the processor 410.

The terminal 40 may further include a power supply 411 (for example, a battery) that supplies power to each component. Optionally, the power supply 411 may be logically connected to the processor 410 by using a power management system, so as to implement functions such as charging management, discharging management, and power consumption management by using the power management system.

In addition, the terminal 40 includes some functional modules that are not shown. Details are not described herein.

Optionally, some embodiments of this disclosure further provide a terminal, including a processor 410, a memory 49, and a computer program stored in the memory 49 and capable of running on the processor 410. When the computer program is executed by the processor 410, the procedures in the foregoing embodiments of the cell reselection method are implemented, with the same technical effect achieved. To avoid repetition, details are not described again herein. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone, a session initiation protocol (SIP) phone, a wireless local loop (WLL) station, or a personal digital assistant (PDA). The wireless terminal may also be referred to as a system, a subscriber unit (Subscriber Unit), a subscriber station (Subscriber Station), a mobile station (Mobile Station), a mobile terminal (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

Some embodiments of this disclosure further provide a computer-readable storage medium, where the computer-readable storage medium stores a computer program. When the computer program is executed by a processor, the procedures in the foregoing embodiments of the cell reselection method are implemented, with the same technical effect achieved. To avoid repetition, details are not described again herein. The computer-readable storage medium is, for example, a read-only memory (ROM), a random access memory (RAM), a magnetic disk, or an optical disc.

The cell reselection method on the terminal side is described in the foregoing embodiments of this disclosure. A cell reselection method on a network device side is further described in the following embodiments with reference to an accompanying drawing.

Figure 5:
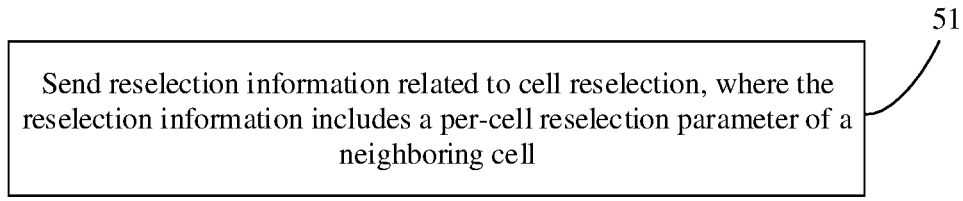
FIG. 5 presents a schematic flowchart of a cell reselection method for a network device according to some embodiments of this disclosure.

As shown in FIG. 5, a cell reselection method in some embodiments of this disclosure is applied to a network device side. The method includes the following step.

Step 51: Send reselection information related to cell reselection, where the reselection information includes a per-cell reselection parameter of a neighboring cell.

The neighboring cell may be one of cells suitable for reselection, and different neighboring cells may be configured with a same priority or different priorities. A cell suitable for reselection is a cell on which a terminal can camp and obtain a normal service. The terminal needs to have a valid USIM, and satisfy the condition that a cell suitable for reselection satisfies in the foregoing embodiments on the terminal side. Details are not described again herein.

The reselection information may be configured by a source cell (or referred to as a serving cell or a current cell) for the terminal. For example, the reselection information may be configured by the source cell for the terminal by using radio resource control (RRC) signaling and/or broadcast to the terminal by using system information. The RRC signaling may be an RRC release (RRC release) message or the like. The system information may be a SIB2, a SIB4, a SIB5, or the like.

The per-cell reselection parameter in some embodiments of this disclosure is a parameter that can represent actual network performance of the neighboring cell. The reselection information may further include a per-frequency reselection parameter of the neighboring cell, where the per-frequency reselection parameter is a parameter that can represent network performance of a frequency of the neighboring cell. Specifically, the per-cell reselection parameter includes at least one of the following parameters: a minimum received signal level parameter, a minimum received signal level offset parameter, a minimum signal quality parameter, a minimum signal quality offset parameter, a power compensation parameter, a measurement offset parameter, a first target offset, a second target offset, a first intermediate quantity related to a received signal level value, a second intermediate quantity related to a signal quality value, and the like. The first target offset is a sum of differences between per-cell parameter values and per-frequency parameter values of at least one of the minimum received signal level parameter, the minimum received signal level offset parameter, the power compensation parameter, and the measurement offset parameter; the second target offset is a sum of differences between per-cell parameter values and per-frequency parameter values of at least one of the minimum signal quality parameter, the minimum signal quality offset parameter, and the measurement offset parameter; the first intermediate quantity is related to a per-cell parameter value of at least one of the minimum received signal level parameter, the minimum received signal level offset parameter, the power compensation parameter, and the measurement offset parameter; and the second intermediate quantity is related to a per-cell parameter value of at least one of the minimum signal quality parameter, the minimum signal quality offset parameter, and the measurement offset parameter. For explanations and descriptions about the foregoing parameters, refer to the embodiments on the terminal side. Details are not described again in the embodiments on the network device side.

It should be noted that the reselection information may further include a PCI of the neighboring cell, where the PCI corresponds to the per-cell reselection parameter. Herein, that the PCI corresponds to the per-cell reselection parameter means that one PCI corresponds to one set of per-cell reselection parameters, that is, one set of per-cell reselection parameters corresponds to one neighboring cell and may jointly represent network performance of the neighboring cell. One set of per-cell reselection parameters may include at least one of the plurality of parameters mentioned above.

The reselection information further includes priority information used to indicate a priority of the neighboring cell. The priority information may include base priority information. In addition, the priority information may further include base priority information and sub-priority information, where a value granularity of the sub-priority information is less than a value granularity of the base priority information. Further, the sub-priority information may include one level of sub-priority information whose value granularity is less than that of a base priority (the value granularity is 1); or the sub-priority information may further include at least two levels of sub-priority information with different value granularities. It should be noted that specific decimal value ranges of the value granularities in some embodiments of this disclosure may be prescribed by a protocol, configured by the network device, or determined by the network device and the terminal through negotiation.

In the cell reselection method in some embodiments of this disclosure, the network device configures the per-cell reselection parameter of the neighboring cell for the terminal. This can ensure that the terminal performs cell reselection based on the per-cell reselection parameter, ensure that quality of the reselected cell satisfies a camping requirement, and avoid a problem of connection instability of the terminal after cell reselection.

The cell reselection method in different scenarios is separately described in detail in the foregoing embodiments. A network device corresponding to the cell reselection method is further described in the following embodiments with reference to an accompanying drawing.

Figure 6:
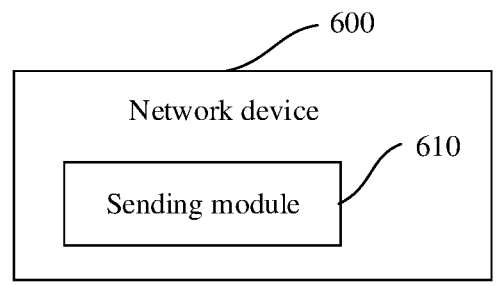
FIG. 6 presents a schematic modular structural diagram of a network device according to some embodiments of this disclosure.

As shown in FIG. 6, a network device 600 in some embodiments of this disclosure can implement details of the method in the foregoing embodiments, that is, sending reselection information related to cell reselection, where the reselection information includes a per-cell reselection parameter of a neighboring cell, and can achieve a same effect. The network device 600 specifically includes the following functional module:

a sending module 610, configured to send reselection information related to cell reselection, where the reselection information includes a per-cell reselection parameter of a neighboring cell.

The per-cell reselection parameter includes at least one of the following parameters:

a minimum received signal level parameter;

a minimum received signal level offset parameter;

a minimum signal quality parameter;

a minimum signal quality offset parameter;

a power compensation parameter;

a measurement offset parameter;

a first target offset, where the first target offset is a sum of differences between per-cell parameter values and per-frequency parameter values of at least one of a minimum received signal level parameter, a minimum received signal level offset parameter, a power compensation parameter, and a measurement offset parameter;

a second target offset, where the second target offset is a sum of differences between per-cell parameter values and per-frequency parameter values of at least one of a minimum signal quality parameter, a minimum signal quality offset parameter, and a measurement offset parameter;

a first intermediate quantity related to a received signal level value, where the first intermediate quantity is related to a per-cell parameter value of at least one of a minimum received signal level parameter, a minimum received signal level offset parameter, a power compensation parameter, and a measurement offset parameter; and a second intermediate quantity related to a signal quality value, where the second intermediate quantity is related to a per-cell parameter value of at least one of a minimum signal quality parameter, a minimum signal quality offset parameter, and a measurement offset parameter.

The minimum received signal level parameter is a target minimum received signal level value broadcast by the neighboring cell; or the minimum received signal level parameter includes a per-frequency minimum received signal level value corresponding to the neighboring cell and a first offset value, where the first offset value is a difference between the target minimum received signal level value and the per-frequency minimum received signal level value.

The minimum received signal level offset parameter is a target minimum received signal level offset value broadcast by the neighboring cell; or the minimum received signal level offset parameter includes a per-frequency minimum received signal level offset value corresponding to the neighboring cell and a second offset value, where the second offset value is a difference between the target minimum received signal level offset value and the per-frequency minimum received signal level offset value.

The minimum signal quality parameter is a target minimum signal quality value broadcast by the neighboring cell; or the minimum signal quality parameter includes a per-frequency minimum signal quality value corresponding to the neighboring cell and a third offset value, where the third offset value is a difference between the target minimum signal quality value and the per-frequency minimum signal quality value.

The minimum signal quality offset parameter is a target minimum signal quality offset value broadcast by the neighboring cell; or the minimum signal quality offset parameter includes a per-frequency minimum signal quality offset value corresponding to the neighboring cell and a fourth offset value, where the fourth offset value is a difference between the target minimum signal quality offset value and the per-frequency minimum signal quality offset value.

The measurement offset parameter is a target measurement offset value broadcast by the neighboring cell; or the measurement offset parameter includes a per-frequency measurement offset value corresponding to the neighboring cell and a fifth offset value, where the fifth offset value is an offset between the target measurement offset value and the per-frequency measurement offset value.

The measurement offset parameter includes a connection failure offset parameter and/or a cell temporary offset parameter.

The power compensation parameter is determined based on a maximum power parameter and a power class parameter.

The maximum power parameter is a target maximum power value corresponding to the neighboring cell; or the maximum power parameter includes a per-frequency maximum power value corresponding to the neighboring cell and a sixth offset value, where the sixth offset value is a difference between the target maximum power value and the per-frequency maximum power value.

The reselection information further includes a physical cell identifier PCI of the neighboring cell, and the PCI corresponds to the per-cell reselection parameter.

The reselection information further includes priority information used to indicate a priority of the neighboring cell.

The priority information includes base priority information; or the priority information includes base priority information and sub-priority information, where a value granularity of the sub-priority information is less than a value granularity of the base priority information.

It should be noted that the network device in some embodiments of this disclosure configures the per-cell reselection parameter of the neighboring cell for the terminal. This can ensure that the terminal performs cell reselection based on the per-cell reselection parameter, ensure that quality of the reselected cell satisfies a camping requirement, and avoid a problem of connection instability of the terminal after cell reselection.

It should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the modules may be configured as one or more integrated circuits for implementing the foregoing method, for example, one or more application-specific integrated circuits (ASIC), or one or more digital signal processors (DSP), or one or more field programmable gate arrays (FPGA). For another example, when one of the foregoing modules is implemented in a form of program code invoked by the processing component, the processing component may be a general processor, for example, a central processing unit (CPU) or another processor that may invoke program code. For another example, the modules may be integrated and implemented in a form of a system-on-a-chip (SOC).

To better achieve the foregoing objective, some embodiments of this disclosure further provide a network device. The network device includes a processor, a memory, and a computer program stored in the memory and capable of running on the processor. When the processor executes the computer program, steps of the foregoing cell reselection method are implemented.

An embodiment of the present disclosure further provides a computer-readable storage medium, where the computer-readable storage medium stores a computer program, and when the computer program is executed by a processor, the steps of the foregoing cell reselection method are implemented.

Figure 7:
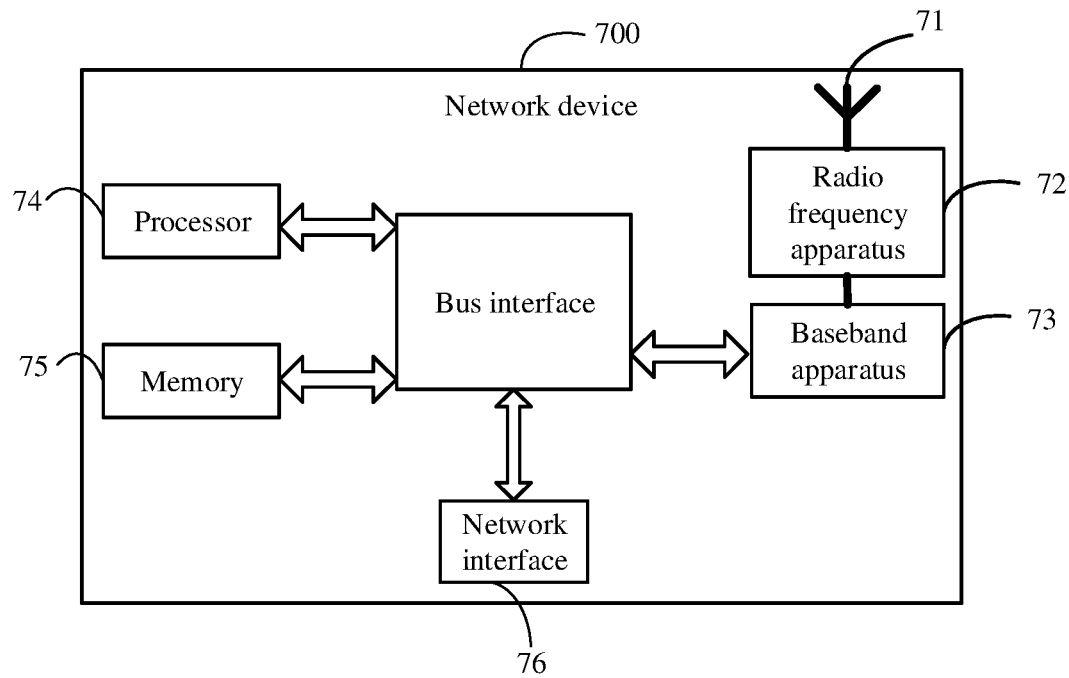
FIG. 7 presents a block diagram of a network device according to some embodiments of this disclosure.

Specifically, some embodiments of this disclosure further provide a network device. As shown in FIG. 7, the network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The radio frequency apparatus may be located in the baseband apparatus 73. The method performed by the network device in the foregoing embodiments may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 7, one of the chips is, for example, the processor 74, connected to the memory 75, to invoke a program in the memory 75 to perform the operation of the network device shown in the foregoing method embodiments.

The baseband apparatus 73 may further include a network interface 76, configured to exchange information with the radio frequency apparatus 72, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. For illustrative rather than restrictive description, a plurality of forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). The memory 75 described in this application is intended to include but is not limited to these and any other suitable types of memories.

Specifically, the network device in some embodiments of this disclosure further includes a computer program stored in the memory 75 and capable of running on the processor 74. The processor 74 invokes the computer program in the memory 75 to perform the method performed by the modules shown in FIG. 6.

Specifically, when being invoked by the processor 74, the computer program may be configured to send reselection information related to cell reselection, where the reselection information includes a per-cell reselection parameter of a neighboring cell.

The network device in some embodiments of this disclosure configures the per-cell reselection parameter of the neighboring cell for the terminal. This can ensure that the terminal performs cell reselection based on the per-cell reselection parameter, ensure that quality of the reselected cell satisfies a camping requirement, and avoid a problem of connection instability of the terminal after cell reselection.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communication connections through some interfaces, apparatuses or units, and may be in electrical, mechanical, or other forms.

The units described as separate components may or may not be physically separate. Components displayed as units may or may not be physical units, that is, they may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A cell reselection method, applied to a terminal and comprising:

obtaining reselection information related to cell reselection, wherein the reselection information comprises a per-cell reselection parameter of a neighboring cell; and performing a cell reselection procedure based on the per-cell reselection parameter and a reselection condition for reselecting to the neighboring cell;

wherein the per-cell reselection parameter comprises at least one of the following parameters:

a minimum received signal level parameter, wherein the minimum received signal level parameter comprises a per-frequency minimum received signal level value corresponding to the neighboring cell and a first offset value, wherein the first offset value is a difference between a target minimum received signal level value and the per-frequency minimum received signal level value;

a minimum received signal level offset parameter, wherein the minimum received signal level offset parameter comprises a per-frequency minimum received signal level offset value corresponding to the neighboring cell and a second offset value, wherein the second offset value is a difference between the target minimum received signal level offset value and the per-frequency minimum received signal level offset value;

a minimum signal quality parameter, wherein the minimum signal quality parameter comprises a per-frequency minimum signal quality value corresponding to the neighboring cell and a third offset value, wherein the third offset value is a difference between the target minimum signal quality value and the per-frequency minimum signal quality value;

a minimum signal quality offset parameter, wherein the minimum signal quality offset parameter comprises a per-frequency minimum signal quality offset value corresponding to the neighboring cell and a fourth offset value, wherein the fourth offset value is a difference between the target minimum signal quality offset value and the per-frequency minimum signal quality offset value;

a measurement offset parameter, wherein the measurement offset parameter comprises a per-frequency measurement offset value corresponding to the neighboring cell and a fifth offset value, wherein the fifth offset value is an offset between the target measurement offset value and the per-frequency measurement offset value;

a first target offset, wherein the first target offset is a sum of differences between per-cell parameter values and per-frequency parameter values of at least one of a minimum received signal level parameter, a minimum received signal level offset parameter, a power compensation parameter, or a measurement offset parameter;

a second target offset, wherein the second target offset is a sum of differences between per-cell parameter values and per-frequency parameter values of at least one of a minimum signal quality parameter, a minimum signal quality offset parameter, or a measurement offset parameter.

2. The cell reselection method according to claim 1, wherein the reselection information is configured by a network device in a source cell in which the terminal is located, or the reselection information is obtained from a historically received message.

3. The cell reselection method according to claim 1, wherein the step of performing a cell reselection procedure based on the reselection parameter and a reselection condition for reselecting to the neighboring cell comprises:
calculating a cell-selection received signal level value of the neighboring cell based on a measured received signal level value and at least one of the minimum received signal level parameter, the minimum received signal level offset parameter, or the measurement offset parameter in the selection parameter;
calculating a cell-selection signal quality value of the neighboring cell based on a measured received signal quality value and at least one of the minimum signal quality parameter, the minimum signal quality offset parameter, or the measurement offset parameter in the selection parameter; and
performing the cell reselection procedure based on the cell-selection received signal level value, the cell-selection signal quality value, and the reselection condition for reselecting to the neighboring cell;
or
the step of performing a cell reselection procedure based on the reselection parameter and a reselection condition for reselecting to the neighboring cell comprises:
calculating a cell-selection received signal level value of the neighboring cell based on a measured received signal level value, a first target parameter value, and the first target offset, wherein the first target parameter value is the per-frequency parameter value of the at least one of the minimum received signal level parameter, the minimum received signal level offset parameter, the power compensation parameter, or the measurement offset parameter;
calculating a cell-selection signal quality value of the neighboring cell based on a measured received signal quality value, a second target parameter value, and the second target offset, wherein the second target parameter value is the per-frequency parameter value of the at least one of the minimum signal quality parameter, the minimum signal quality offset parameter, or the measurement offset parameter; and
performing the cell reselection procedure based on the cell-selection received signal level value, the cell-selection signal quality value, and the reselection condition for reselecting to the neighboring cell;
or
the step of performing a cell reselection procedure based on the reselection parameter and a reselection condition for reselecting to the neighboring cell comprises:
calculating a cell-selection received signal level value of the neighboring cell based on a measured received signal level value and a first intermediate quantity;
calculating a cell-selection signal quality value of the neighboring cell based on a measured received signal quality value and a second intermediate quantity; and
performing the cell reselection procedure based on the cell-selection received signal level value, the cell-selection signal quality value, and the reselection condition for reselecting to the neighboring cell.

4. The cell reselection method according to claim 3, wherein the step of performing the cell reselection procedure based on the cell-selection received signal level value, the cell-selection signal quality value, and the reselection condition for reselecting to the neighboring cell comprises:
in a case in which neighboring cells have a same priority as the source cell or neighboring cells are on a same frequency as the source cell, if the cell-selection received signal level values and the cell-selection signal quality values are all greater than 0, ranking the source cell and the neighboring cells; and
if the source cell does not provide a rank threshold, reselecting from the source cell to a best ranked cell in the neighboring cells; or
if the source cell provides a rank threshold, reselecting from the source cell to one of first cells that has a largest quantity of beams whose quality is higher than a threshold, wherein the first cell is a cell with a difference between a rank thereof and a rank of a best ranked cell in the neighboring cells being less than or equal to the rank threshold.

5. The cell reselection method according to claim 3, wherein the step of performing the cell reselection procedure based on the cell-selection received signal level value, the cell-selection signal quality value, and the reselection condition for reselecting to the neighboring cell comprises:
in a case in which a priority of the neighboring cell is lower than a priority of the source cell, when the source cell provides $Thresh_{Serving,LowQ}$ corresponding to Squal of the source cell, if Squal of the source cell is less than $Thresh_{Serving,LowQ}$, and Squal of the neighboring cell is greater than $Thresh_{X,LowQ}$ or Srxlev of the neighboring cell is greater than $Thresh_{X,LowP}$ in a reselection time period $Treselection_{RAT}$, reselecting from the source cell to the neighboring cell; or
when the source cell does not provide $Thresh_{Serving,LowQ}$ corresponding to Squal of the source cell, if Srxlev of the source cell is less than $Thresh_{Serving,LowP}$, and Srxlev of the neighboring cell is greater than $Thresh_{X,LowP}$ in a reselection time period $Treselection_{RAT}$, reselecting from the source cell to the neighboring cell; wherein
Squal is a cell-selection signal quality value, Srxlev is a cell-selection received signal level value, $Thresh_{Serving,LowQ}$ is a Squal threshold of the source cell, $Thresh_{Serving,LowP}$ is an Srxlev threshold of the source cell, $Thresh_{X,LowQ}$ is a Squal threshold of the neighboring cell, and $Thresh_{X,LowP}$ is an Srxlev threshold of the neighboring cell.

6. The cell reselection method according to claim 3, wherein the step of performing the cell reselection procedure based on the cell-selection received signal level value, the cell-selection signal quality value, and the reselection condition for reselecting to the neighboring cell comprises:
in a case in which a priority of the neighboring cell is higher than a priority of the source cell, when the source cell provides $Thresh_{Serving,LowQ}$ corresponding to Squal of the source cell, if Squal of the neighboring cell is greater than $Thresh_{X,HighQ}$ in a reselection time period $Treselection_{RAT}$, reselecting from the source cell to the neighboring cell; or
when the source cell does not provide $Thresh_{Serving,LowQ}$ corresponding to Squal of the source cell, if Srxlev of the neighboring cell is greater than $Thresh_{X,HighP}$ in a reselection time period $Treselection_{RAT}$, reselecting from the source cell to the neighboring cell; wherein
Squal is a cell-selection signal quality value, Srxlev is a cell-selection received signal level value, $Thresh_{Serving,LowQ}$ is a Squal threshold of the source cell, $Thresh_{X,HighQ}$ is a Squal threshold of the neighboring cell, and $Thresh_{X,HighP}$ is an Srxlev threshold of the neighboring cell.

7. The cell reselection method according to claim 1, wherein the reselection information further comprises at least one of:
- a physical cell identifier PCI of the neighboring cell, wherein the PCI corresponds to the per-cell reselection parameter;

or
- priority information used to indicate a priority of the neighboring cell.

8. A terminal, comprising: a processor, a memory, and a computer program stored in the memory and capable of running on the processor, wherein the processor executes the computer program to:
- obtain reselection information related to cell reselection, wherein the reselection information comprises a per-cell reselection parameter of a neighboring cell; and
- perform a cell reselection procedure based on the per-cell reselection parameter and a reselection condition for reselecting to the neighboring cell;

wherein the per-cell reselection parameter comprises at least one of the following parameters:
- a minimum received signal level parameter, wherein the minimum received signal level parameter comprises a per-frequency minimum received signal level value corresponding to the neighboring cell and a first offset value, wherein the first offset value is a difference between a target minimum received signal level value and the per-frequency minimum received signal level value;
- a minimum received signal level offset parameter, wherein the minimum received signal level offset parameter comprises a per-frequency minimum received signal level offset value corresponding to the neighboring cell and a second offset value, wherein the second offset value is a difference between the target minimum received signal level offset value and the per-frequency minimum received signal level offset value;
- a minimum signal quality parameter, wherein the minimum signal quality parameter comprises a per-frequency minimum signal quality value corresponding to the neighboring cell and a third offset value, wherein the third offset value is a difference between the target minimum signal quality value and the per-frequency minimum signal quality value;
- a minimum signal quality offset parameter, wherein the minimum signal quality offset parameter comprises a per-frequency minimum signal quality offset value corresponding to the neighboring cell and a fourth offset value, wherein the fourth offset value is a difference between the target minimum signal quality offset value and the per-frequency minimum signal quality offset value;
- a measurement offset parameter, wherein the measurement offset parameter comprises a per-frequency measurement offset value corresponding to the neighboring cell and a fifth offset value, wherein the fifth offset value is an offset between the target measurement offset value and the per-frequency measurement offset value;
- a first target offset, wherein the first target offset is a sum of differences between per-cell parameter values and per-frequency parameter values of at least one of a minimum received signal level parameter, a minimum received signal level offset parameter, a power compensation parameter, or a measurement offset parameter;
- a second target offset, wherein the second target offset is a sum of differences between per-cell parameter values and per-frequency parameter values of at least one of a minimum signal quality parameter, a minimum signal quality offset parameter, or a measurement offset parameter.

9. The terminal according to claim 8, wherein the reselection information is configured by a network device in a source cell in which the terminal is located, or the reselection information is obtained from a historically received message.

10. A network device, comprising: a processor, a memory, and a computer program stored in the memory and capable of running on the processor, wherein the processor executes the computer program to:
- send reselection information related to cell reselection, wherein the reselection information comprises a per-cell reselection parameter of a neighboring cell;

wherein the per-cell reselection parameter comprises at least one of the following parameters:
- a minimum received signal level parameter, wherein the minimum received signal level parameter comprises a per-frequency minimum received signal level value corresponding to the neighboring cell and a first offset value, wherein the first offset value is a difference between a target minimum received signal level value and the per-frequency minimum received signal level value;
- a minimum received signal level offset parameter, wherein the minimum received signal level offset parameter comprises a per-frequency minimum received signal level offset value corresponding to the neighboring cell and a second offset value, wherein the second offset value is a difference between the target minimum received signal level offset value and the per-frequency minimum received signal level offset value;
- a minimum signal quality parameter, wherein the minimum signal quality parameter comprises a per-frequency minimum signal quality value corresponding to the neighboring cell and a third offset value, wherein the third offset value is a difference between the target minimum signal quality value and the per-frequency minimum signal quality value;
- a minimum signal quality offset parameter, wherein the minimum signal quality offset parameter comprises a per-frequency minimum signal quality offset value corresponding to the neighboring cell and a fourth offset value, wherein the fourth offset value is a difference between the target minimum signal quality offset value and the per-frequency minimum signal quality offset value;
- a measurement offset parameter, wherein the measurement offset parameter comprises a per-frequency measurement offset value corresponding to the neighboring cell and a fifth offset value, wherein the fifth offset value is an offset between the target measurement offset value and the per-frequency measurement offset value;
- a first target offset, wherein the first target offset is a sum of differences between per-cell parameter values and per-frequency parameter values of at least one of a minimum received signal level parameter, a minimum received signal level offset parameter, a power compensation parameter, or a measurement offset parameter;
- a second target offset, wherein the second target offset is a sum of differences between per-cell parameter values and per-frequency parameter values of at least one of a minimum signal quality parameter, a minimum signal quality offset parameter, or a measurement offset parameter.

\* \* \* \* \*